United States Patent
Wang et al.

(10) Patent No.: US 9,250,431 B2
(45) Date of Patent: Feb. 2, 2016

(54) DIFFUSING COLLECTION LENS FOR DIRECT COUPLED HIGH POWER MICROSCOPY ILLUMINATION SYSTEMS

(71) Applicant: Excelitas Canada, Inc., Vaudreuil-Dorion (CA)

(72) Inventors: Yong Wang, Markham (CA); Paul Constantinou, Burlington (CA)

(73) Assignee: Excelitas Canada, Inc., Vaudreuil-Dorion (CA)

( * ) Notice: Subject to any disclaimer, the term of this patent is extended or adjusted under 35 U.S.C. 154(b) by 0 days.

(21) Appl. No.: 14/477,994

(22) Filed: Sep. 5, 2014

(65) Prior Publication Data

US 2015/0062698 A1    Mar. 5, 2015

Related U.S. Application Data

(60) Provisional application No. 61/874,145, filed on Sep. 5, 2013.

(51) Int. Cl.
*G02B 5/02* (2006.01)
*G02B 21/00* (2006.01)
*G02B 21/06* (2006.01)
*G02B 21/08* (2006.01)
*G02B 21/16* (2006.01)
*G02B 27/10* (2006.01)

(52) U.S. Cl.
CPC ............... *G02B 21/08* (2013.01); *G02B 21/16* (2013.01); *G02B 27/106* (2013.01); *G02B 5/0278* (2013.01); *Y10T 29/49826* (2015.01)

(58) Field of Classification Search
CPC ...... G02B 21/08; G02B 21/16; G02B 27/106; G02B 5/0278
USPC ......................................... 359/385, 707, 900
See application file for complete search history.

(56) References Cited

U.S. PATENT DOCUMENTS

| | | | |
|---|---|---|---|
| 7,016,566 B2 | 3/2006 | Dimas et al. | |
| 7,329,907 B2* | 2/2008 | Pang et al. | 257/99 |
| 7,477,458 B2* | 1/2009 | Nakamura | 359/707 |
| 9,099,575 B2* | 8/2015 | Medendorp, Jr. | H01L 33/0095 |
| 9,182,596 B2* | 11/2015 | Border | G02B 27/0093 |
| 2002/0044347 A1* | 4/2002 | Steenblik et al. | 359/368 |
| 2003/0214812 A1* | 11/2003 | Bourdelais et al. | 362/330 |
| 2004/0239243 A1* | 12/2004 | Roberts et al. | 313/512 |
| 2005/0099824 A1* | 5/2005 | Dowling et al. | 362/572 |
| 2005/0253533 A1* | 11/2005 | Lys et al. | 315/224 |
| 2006/0022214 A1* | 2/2006 | Morgan et al. | 257/99 |
| 2006/0072319 A1* | 4/2006 | Dziekan et al. | 362/249 |
| 2008/0278571 A1* | 11/2008 | Mora et al. | 348/48 |
| 2011/0115897 A1* | 5/2011 | Najmabadi et al. | 348/79 |
| 2012/0127569 A1* | 5/2012 | Mizuta | 359/385 |

(Continued)

*Primary Examiner* — Frank Font
(74) *Attorney, Agent, or Firm* — Peter A. Nieves; Sheehan Phinney Bass + Green PA

(57) ABSTRACT

A high power microscopy illumination system is disclosed, including a solid state illumination source. A diffusing collection lens having a diffusing surface is configured to collect and diffuse light emission from the solid state illumination source. An emitting surface is disposed substantially opposite the diffusing surface. An optical coupling element couples the light emission from the diffusing collection lens emitting surface along an optical axis to an optical output. The diffusing collection lens provides improved uniformity of illumination with direct coupling, without significant power loss.

17 Claims, 7 Drawing Sheets

(56) References Cited

U.S. PATENT DOCUMENTS

| | | | |
|---|---|---|---|
| 2012/0194420 A1* | 8/2012 | Osterhout et al. | 345/156 |
| 2012/0321759 A1* | 12/2012 | Marinkovich et al. | 426/231 |
| 2014/0106389 A1* | 4/2014 | Loewke et al. | 435/29 |
| 2014/0301076 A1* | 10/2014 | Ter-Hovhannisyan | 362/235 |
| 2015/0021628 A1* | 1/2015 | Medendorp et al. | 257/88 |

* cited by examiner

DIFFUSING COLLECTION LENS FOR DIRECT COUPLED HIGH POWER MICROSCOPY ILLUMINATION SYSTEMS

CROSS-REFERENCE TO RELATED APPLICATIONS

This application claims the benefit of U.S. Provisional Patent Application Ser. No. 61/874,145, filed Sep. 5, 2013, entitled "Diffusing Collection Lens for Direct Coupled High Power Microscopy Illumination Systems," which is incorporated by reference herein in its entirety.

FIELD OF THE INVENTION

The present invention relates to high-power illumination systems for microscopy applications, such as fluorescence imaging and analysis, and particularly relates to lenses and diffusers for improved uniformity of illumination.

BACKGROUND OF THE INVENTION

Direct coupling of a high-brightness illumination source to a microscope potentially maximizes the optical coupling efficiency. Traditionally, an arc lamp is directly coupled to a fluorescence microscope by adjusting a collimating lens to achieve Koehler illumination. However, more modern light sources use a non-adjustable collimating optic, for example, the LDGI X-Cite series, which couples light indirectly through a liquid light guide and homogenizer, as described for example in U.S. Pat. No. 7,016,566. This type of light source is much simpler to use since it removes the need for periodic re-alignment required for traditional direct-coupled light sources. However, for direct coupling with a non-adjustable adaptor, the uniformity at the objective plane of an illumination source is a challenge for both lamp and LED light sources. For example, electrode structures on LEDs may be used to spread the current over the emitting area. These electrodes block light emission, causing undesirable optical non-uniformity.

One way to improve the uniformity of illumination is to insert a diffuser, with an appropriate diffusing grit, or with a fly eye lens array into the optical path. Typical diffusers come in the form of ground glass plates (but could also be coated glass or holographic glass). An ideal diffuser would scatter the light in a Lambertian pattern with zero loss. The amount of scatter or diffusion is determined by the "grit." Grit refers to the size of the sand particle used in sandblasting of the glass. In practice, the diffuser generally causes a significant decrease in the optical power coupled to the objective plane. This may not be an issue with powerful, high-intensity arc lamp sources. However, for LED sources, the power loss incurred may be unacceptable. Furthermore, a fly eye lens array is expensive, and is often not a cost-effective option for the majority of microscopy applications.

Thus, there is a need for improved or alternative microscopy illumination systems, particularly those based on solid-state light sources that address one or more of the above-mentioned problems.

SUMMARY OF THE INVENTION

Embodiments of the present invention provide devices and methods for a diffusing collection lens for direct coupled high power microscopy illumination systems. Briefly described, a first aspect of the present invention is directed to a diffusing collection lens for a high-power microscopy illumination system.

A second aspect of the invention provides a high-power microscopy illumination system including a LED illumination source, a diffusing collection lens arranged with a diffusing surface on a surface of the diffusing lens for collecting light emission from the LED illumination source, and means for directly coupling the illumination system to a microscope imaging system.

Advantageously, the diffusing surface of the lens is provided on a first surface of the collection lens, nearest the LED illumination source, and the refractive surfaces of the lens may have the form of one of a half-ball lens, or a plano-convex, meniscus, aspheric, or double convex lens.

The LED illumination source may include a single LED light source, or it may include a plurality of LED light sources. A dichroic beam-splitter/combiner may be provided to combine emission from a plurality of LED light sources along a common optical axis. Advantageously, in this arrangement, the diffusing collection lens improves the uniformity of illumination, but does not decrease optical coupling efficiency significantly.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

DETAILED DESCRIPTION

Figure 1:
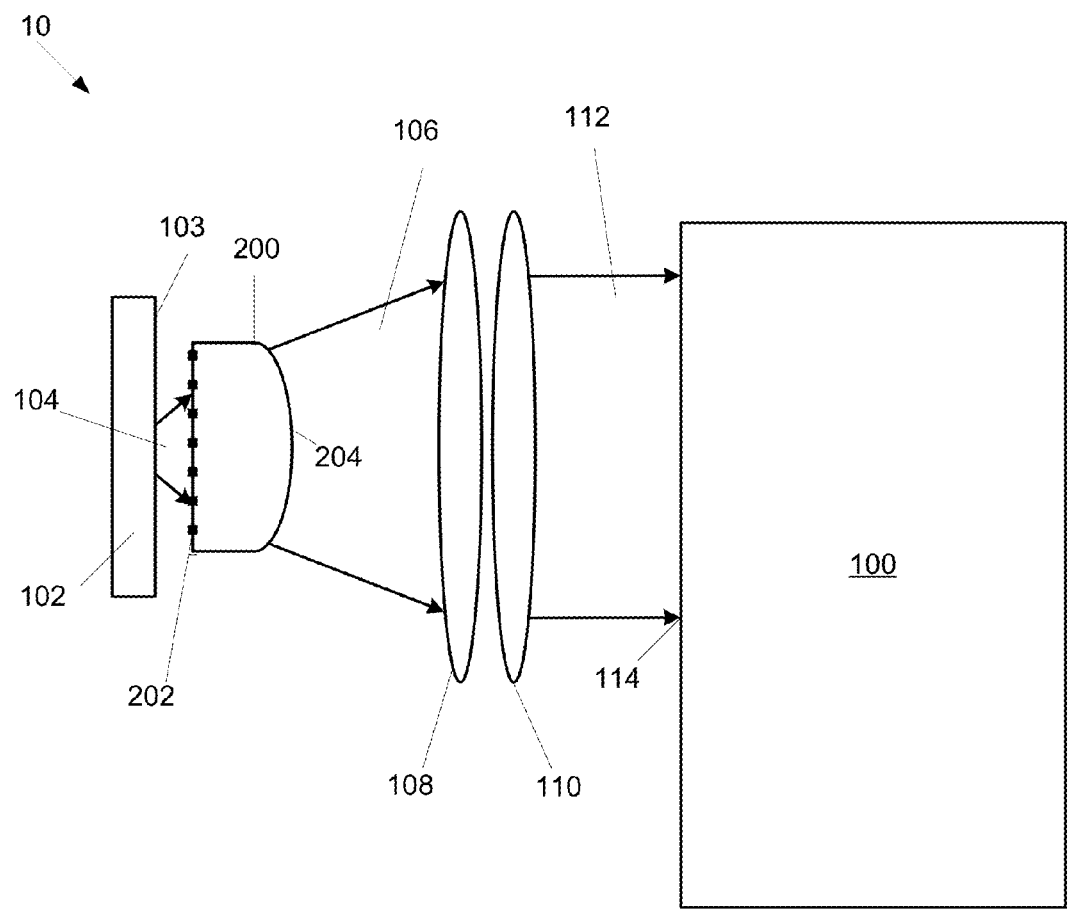
FIG. 1 is a schematic diagram showing elements of an illumination system for a microscope according to a first embodiment of the invention.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

As used within this disclosure, "substantially" means "very nearly," for example, "substantially uniform" means uniform within normal manufacturing tolerances as would be expected by persons having ordinary skill in the art.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "array" should be understood to refer to a regular arrangement of LEDs, for example, but not limited to a rectangular m×n array having m rows of n substantially linear columns of LEDs, such that m is at least 1 and n is at least 3. Adjacent rows of LED columns may be generally parallel, such that the LEDs in adjacent rows may be aligned, or may be offset.

Embodiments of the present invention seek to overcome or mitigate one or more of the abovementioned disadvantages of known illumination systems for microscopy, fluorescence imaging and analysis. Reference will now be made in detail to embodiments of the present invention, examples of which are illustrated in the accompanying drawings. Wherever possible, the same reference numbers are used in the drawings and the description to refer to the same or like parts.

FIG. 1 shows a schematic diagram having elements of an illumination system 10 for a microscope 100, according to a first embodiment of the present invention. The optical layout includes a solid state light source 102, for example, an LED or LED array. Light emission 104 from the solid state light source 102 is collected by a diffusing lens 200. The diffusing lens 200 has a first surface 202 facing the solid state light source 102, which is a diffusing surface, such as ground glass or sand blasting diffuser, for a non-limiting example approximately 220-500 grit depending on the solid state light source 102 being used. The second surface 204 of the lens 200 may be, for example, a smooth convex surface. The structure of the diffusing surface 202 may be selected to improve the uniformity of the beam 112 at an objective plane, for this embodiment, the optical input 104, while not significantly decreasing the light coupling to the microscope 100. For example, the illumination level at the coupling is reduced by less than on the order of 25%. The system 10 is configured to transmit light from the solid state light source 102 along an optical axis (not shown) to an optical output 114, coinciding with an optical input of the microscope 100, or other optical device.

The amount of surface roughness for the diffusing lens surface 202 is determinative to the performance of the device. For example, not enough roughness in the diffusing surface 202 may lead to non-uniformity of the resulting light, while too much roughness may lead to excessive light loss. Examples of processes for producing a diffusing lens surface 202 having satisfactory roughness for a device having a UV LED with a 385 nm center wavelength follow. However, similar the diffusion could be applied to any UV/VIS LED for illumination.

Sandblasting a diffusing lens surface 202 using 400 grit (average particle size on the order of 0.001 to 0.0009 inches) with two orthogonal passes may produce a satisfactorily diffusing surface. Alternatively, using micro abrasives such as Microgrit WCA (an alumina powder developed and introduced by Micro Abrasives Corporation) 1" or equivalent alumina powder using a lapping process in conjunction with steel or cast iron tooling (preferably not a polishing pitch or a polishing pad) may produce a satisfactorily diffusing surface. The WCA 1" may be mixed, for example, at 19% solids with DI water. Other processes for treating the diffusing lens surface 202 are also possible.

The lens 200 collects light emission 104 from the solid state light source 102 and forms a diverging beam 106, which is then collimated by collimating optics, in the first embodiment collimation lenses 108 and 110, producing collimated light 112. While FIG. 1 shows two collimation lenses 108, 110, a single lens, or multiple lenses could be used. The choices for collimation lens configuration and type depends on the particular optical train for the instrument being coupled to (the microscope 100 in this embodiment) as well as cost vs performance tradeoffs. More lenses typically work better for efficiency, but cost more and require a larger footprint. For simplicity and cost reasons, a single collimating lens may be used. The collimated light 112 is coupled to an optical input 114 of the microscope 100, at an optical output of the system 10. Microscopes 100 generally include a mount to which the illumination system 10 may be mounted. Such microscopes 100 generally accept a collimated beam of light, and include components to filter/direct this light to a sample plane for exposure, excitation, observation, and the like.

Figure 2:
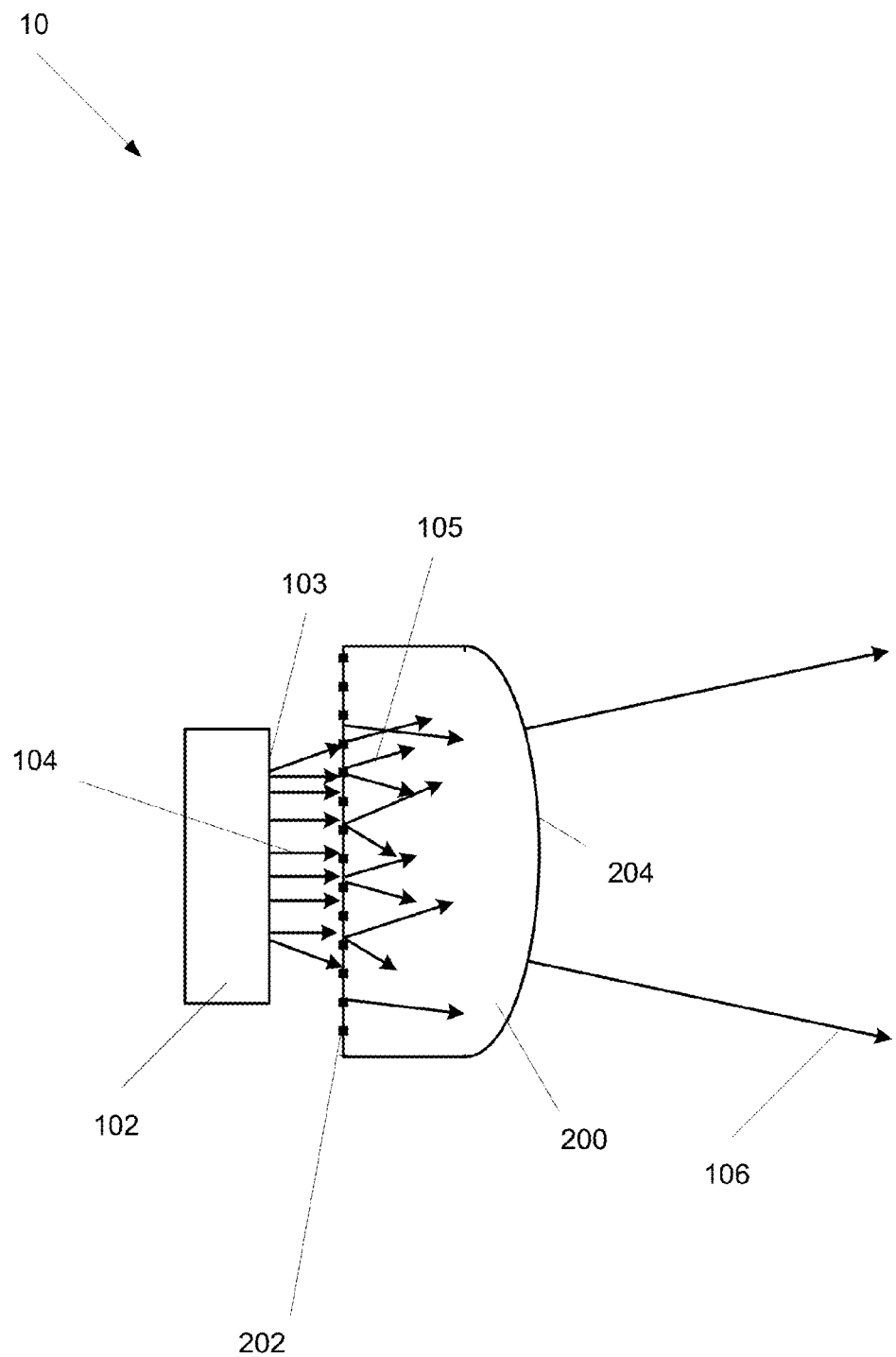
FIG. 2 is a schematic diagram showing an enlarged view of the LED light source and diffusing lens of the system of FIG. 1.

FIG. 2 is an enlarged view showing more detail of the diffusing collection lens 200. The emitter surface 103 of the solid state light source 102 usually has a die structure pattern, due to the multiple emitters and electrodes on the surface of the solid state light source 102. The front surface 202 of the lens 200 is structured to provide a diffusing surface and the rear surface 204 of the lens 200 may be a smooth surface. The light 104 emitted by the solid state light source 102 is diffused by the diffusing surface 202. The diffused light 105 is directly collected by the smooth surface 204 of the lens and directed into beam 106. The use of a diffusing lens 200 significantly increases the coupling efficiency relative to use of a conventional flat diffuser with a separate lens.

Figure 3A:
FIG. 3A is a photograph illustrating the uniformity of illumination at the objective plane of the microscope with a diffusing lens.
Figure 3B:
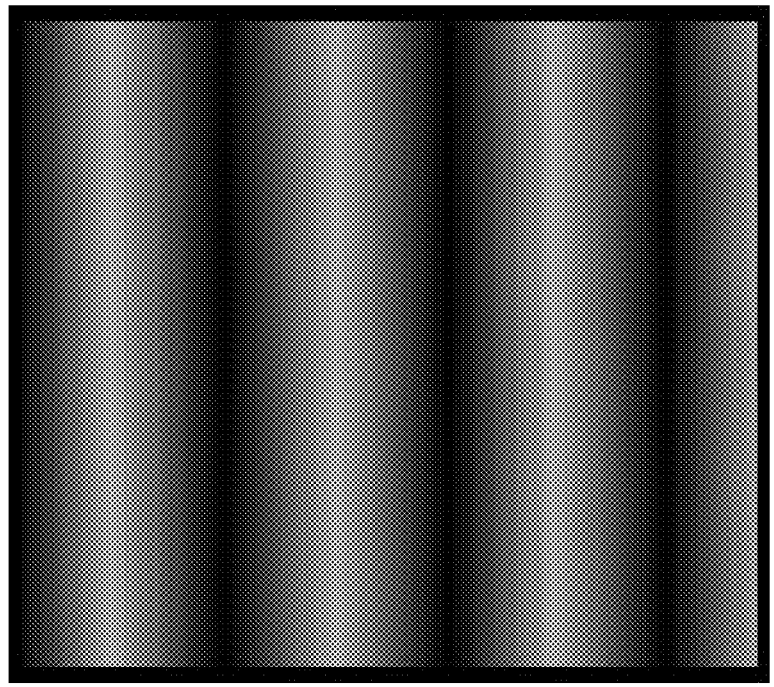
FIG. 3B is a photograph illustrating the uniformity of illumination at the objective plane of the microscope with a conventional lens.
Figure 4B:
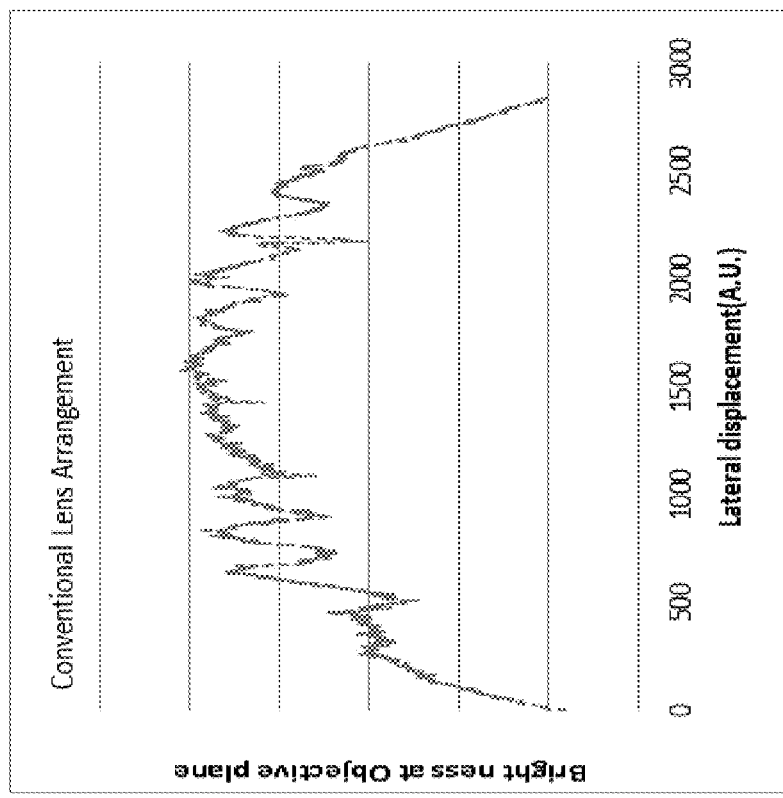
FIG. 4B is a plot of the brightness at the objective plane, laterally across the field of view with a conventional lens.
Figure 4A:
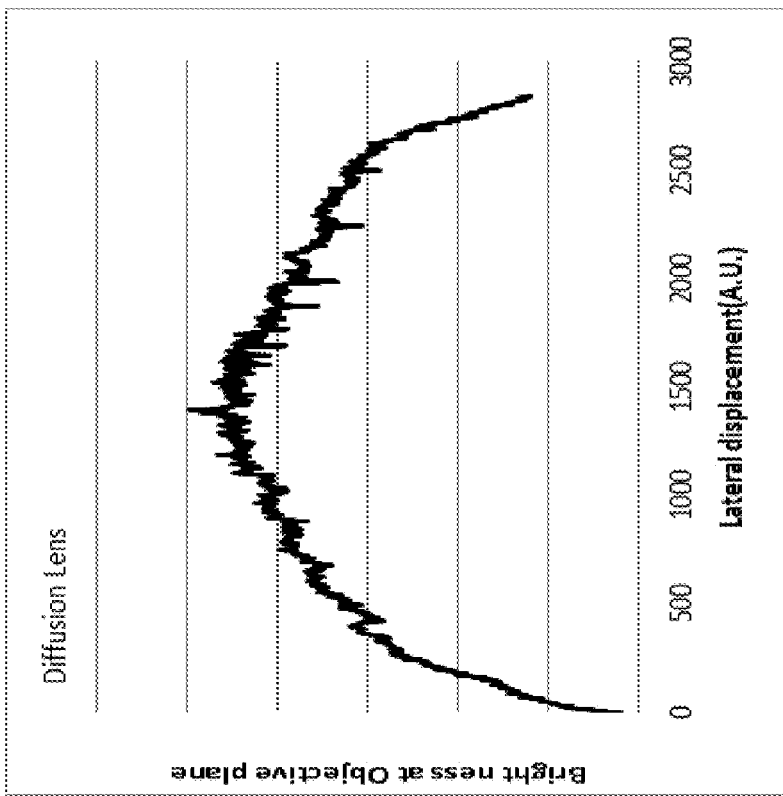
FIG. 4A is a plot of the brightness at the objective plane, laterally across the field of view with the diffusing lens.
Figure 4C:
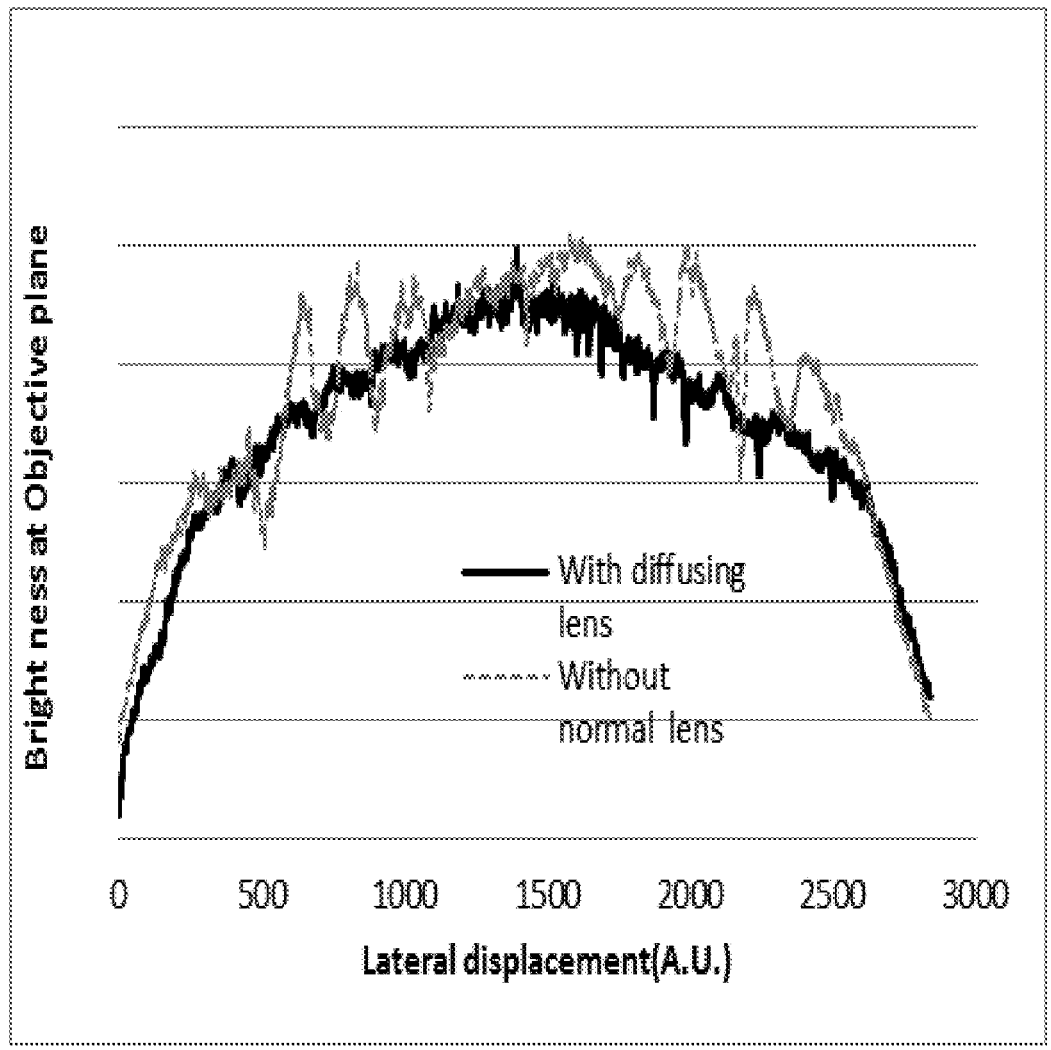
FIG. 4C is an overlaid plot of the brightness at the objective plane, laterally across the field of view with the diffusing lens, and with a conventional lens.

FIGS. 3A and 3B show exemplary images comparing the uniformity of illumination using a diffusing collection lens 200 (FIG. 2) according to this embodiment of the invention, as shown in FIG. 3A, and using a normal (i.e. conventional) collection lens, as shown in FIG. 3B. It is apparent from these images that the uniformity of illumination at the objective plane is significantly improved when using the diffusing collection lens. FIGS. 4A-4C show plots of the brightness at the objective plane, laterally across the field of view. Comparison of the curves with the diffusing lens (FIG. 4A) and with a normal lens (FIG. 4B) demonstrates graphically that the scattering of the light 105 (FIG. 2) at the diffusing surface 202 (FIG. 2) of the diffusing lens significantly decreases the die structure pattern in the emitted light, but does not significantly decrease the brightness. FIG. 4C shows overlaid plots of FIG. 4A and FIG. 4B.

Table 1 shows experimental results under the first embodiment, which indicate that the power decrease at the objective plane is acceptable for typical fluorescence microscopy. The optical power coupling with the diffusing lens 200 (FIG. 2) is close to that when using a normal (i.e. conventional) coupling lens, but significantly better than with the normal lens plus a separate diffuser. These results show that inserting a separate diffuser reduces the optical power at the objective plane by over 50%. However, using the diffusing lens 200 (FIG. 2) reduces the optical power at the objective plane only 12% to 17% relative to using a normal collection lens in this microscopy experiment.

TABLE 1

Optical Power at the Objective Plane.

| | Objective Magnification | | |
|---|---|---|---|
| | 10X | 20X | 40X |
| Power at Objective Plane (mW, Normal Lens only) | 28.9 | 37.2 | 25.1 |
| Power at Objective Plane (mW, Diffusing Lens) | 24 | 32.2 | 22.2 |
| Power at objective plane (mW, Normal Lens plus Flat Diffuser) | 11.1 | 18.4 | 9.0 |

Table 2 shows an example of simulation results by using simulation software "LightTools." The three different conditions are simulated for a plano-convex lens: 1. Diffusing surface on front surface of the lens; 2. Diffusing surface on the rear surface of the lens; and 3. A normal lens with a separate flat diffuser. For the simulation, the diffusing surface provides approximately a Gaussian scattering where the Gaussian spread is 15 degrees. In theory, providing the diffusing surface on the front surface of the lens can provide a significant improvement in the optical power coupling (i.e. almost double) relative to providing the diffusing surface on the rear surface of the lens, or relative to a normal lens with a separate flat diffuser.

TABLE 2

| | Power at Objective Plane (mW) |
|---|---|
| With diffusing surface on front lens surface | 142 |
| With diffusing surface on rear lens surface | 80 |
| With conventional lens and separate diffuser | 76 |

Figure 5:
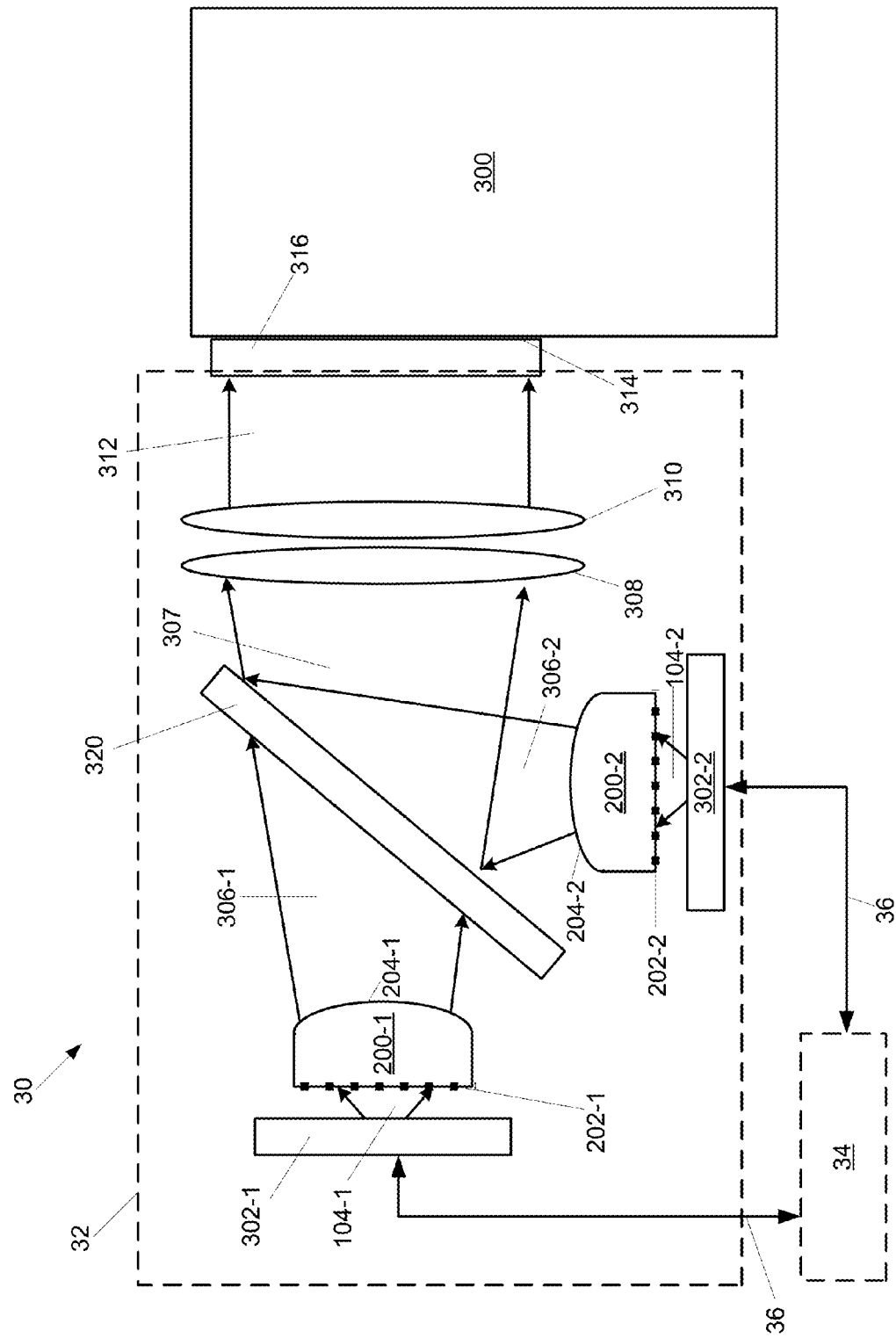
FIG. 5 is a schematic diagram of elements of an illumination system for a fluorescence imaging system according to a second embodiment of the invention.

FIG. 5 shows a schematic diagram having elements of an illumination system 30 for a fluorescence imaging system 300, according to a second embodiment of the present invention. This system includes two solid state light sources 302-1 and 302-2, for example, LED light sources and/or LED arrays. Light emission 104-1 from the first solid state light source 302-1 is coupled through a first diffusion lens 200-1, for example, a plano-convex lens, having a first surface 202-1 that is a diffusion surface and a second surface 204-1, which may be a convex smooth surface. Similarly, light emission 104-2 from the second solid state light source 302-2 is coupled through a second diffusion lens 200-2, for example, a plano-convex lens, having a first surface 202-2, which is a diffusion surface and a second surface 204-2, which may be a convex smooth surface.

The collected beam of light emission 306-1 from the first solid state light source 302-1 and the collected beam of light emission 306-2 from the second solid state light source 302-2 are combined along a common optical axis using a dichroic element 320 as a beam-splitter/combiner. The combined beam 307 from the two LED light sources 302-1, 302-2 is directed through collimation lenses 308 and 310, and the collimated beam 312 is directed to the optical input 314 of the fluorescence imaging system 300. Each of the diffusion lenses 200-1 and 200-2 preferably comprises a plano-convex or half-ball lens, which has a planar diffusing surface, and the diffusing surface 202-1, 202-2 which is positioned to face the LED light source 302-1, 302-2. However, other lens configurations may be used depending upon particular light sources 302-1, 302-2 to meet the requirements of the uniformity and optical power at the objective plane.

The first diffusing surface 202-1 and the second diffusing surface 202-2 may have identical diffusion patterns, or the first diffusing surface 202-1 and the second diffusing surface 202-2 may have different diffusion patterns. It may be advantageous to have different diffusion patterns for the first diffusing surface 202-1 and the second diffusing surface 202-2, and the lenses 200-1 and 200-2 may not be identical. For example, if the first solid state light source 302-1 and the second solid state light source 302-2 are different, for example, having a different electrode structure on top of the LEDs, a different diffusing pattern (or "blurring pattern") may be used for the first diffusing surface 202-1 and the second diffusing surface 202-2 to provide uniformity of illumination.

Preferably, the illumination system 30 is housed in a housing 32, which has a mechanical coupling means 316 and/or securing means, such as a conventional microscope mounting flange for securing the illumination system 30 in optical alignment to the optical input 314 of the fluorescence imaging system 300. As is conventional, a separate control unit 34 including an LED controller with LED drivers may be provided, with electrical connections 36 to the solid state light sources 302-1 and 302-2 within the housing 32.

In other embodiments, the diffusing lens or lenses may include one of a half ball lens, or a plano-convex, meniscus, aspheric or double convex lens, wherein a first surface of the lens is a diffusing surface. If one diffusing surface is not sufficient, another diffusing surface may be provided, for example, one of the collimation lenses may optionally be a diffusing collimation lens, having a first and/or second surface which is a diffusing surface.

Other embodiments are possible. For example, three or more light sources may be combined into the collimating lenses 308, 310, for example, with one or more additional dichroic elements or other combining means. Individual light sources may be distinct from one another. For example, a first light source 302-1 may produce a first wavelength or range of wavelengths, and a second light source 302-2 may produce a second wavelength or range of wavelengths that are combined at the dichroic element 320 into the combined beam 307. As with the first embodiment, there may be one, two, three, or more collimating lenses.

Figure 6:
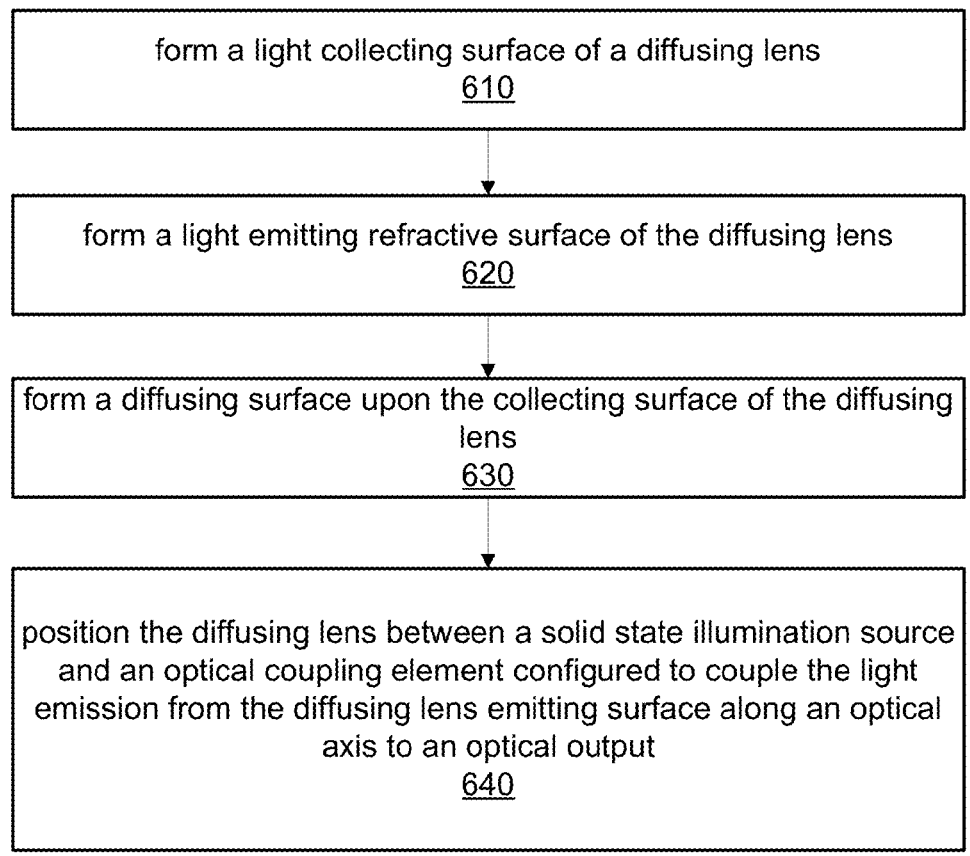
FIG. 6 is a flowchart of an exemplary method for manufacturing a high power illumination system for a microscopy device.

FIG. 6 shows a flowchart for an exemplary method for manufacturing an optical device 10, 30 under the first and/or second embodiments. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A light collecting surface 202 (FIG. 1) of a diffusing lens 200 (FIG. 1) is formed, as shown by block 610. The lens 200 (FIG. 1) may be formed of an appropriate material for conveying light, for example, glass, polycarbonate, plastic, or other ceramics. The surfaces 202, 204 (FIG. 1) of the diffusing lens 200 (FIG. 1) may be formed by techniques familiar to persons having ordinary skill in the art, for example, molding, grinding, cutting, and polishing, among other techniques. The light collecting surface 202 (FIG. 1) shape may be, for example, planar or convex. A light emitting refractive surface 204 (FIG. 1) of the diffusing lens is formed, as shown by block 620. The light emitting surface 204 (FIG. 1) may be formed as a half-ball shape, a plano-convex shape, a meniscus shape, an aspheric shape, among others. The light collecting surface 202 (FIG. 1) and the light emitting surface 204 (FIG. 1) may form a double convex lens (not shown).

A diffusing surface 202 (FIG. 2) is formed upon the collecting surface 202 (FIG. 1) of the diffusing lens 200 (FIG. 1), as shown by block 630. The diffusing surface 202 (FIG. 1) is configured to diffuse the light 104 (FIG. 1) collected from an external light source 102 (FIG. 1), for example, a solid state light source, such as an LED or LED array. The diffusing surface 202 (FIG. 1) may be formed, for example, by scoring or etching a diffusing pattern on the collecting surface 202 (FIG. 1). A diffusing surface 202 (FIG. 1) may also be laminated to the collecting surface 202 (FIG. 1). The diffusing lens 200 (FIG. 1) is positioned between a solid state illumination source 200 (FIG. 1) and an optical coupling element (not shown) configured to couple the light emission from the diffusing lens emitting surface 204 (FIG. 1) along an optical axis to an optical output 114 (FIG. 1), as shown by block 640.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A high power illumination system for a microscopy device comprising:
   a solid state illumination source comprising a plurality of light emitting diode (LED) light sources;
   a diffusing collection lens comprising a diffusing surface configured to collect and diffuse light emission from the solid state illumination source, and an emitting surface disposed substantially opposite the diffusing surface;
   an optical coupling element is configured to couple the light emission from the diffusing collection lens emitting surface along an optical axis to an optical output; and
   a dichroic beam-splitter/combiner configured to direct emission from each of the plurality of LED light sources along a common optical axis to an optical input of the microscopy device.

2. The illumination system of claim 1, further comprising securing means for direct coupling the illumination system to an optical input of the microscopy device.

3. The illumination system of claim 1, wherein the collection lens emitting surface is selected from the group consisting of a half-ball lens, a plano-convex lens, a meniscus lens, and an aspheric lens, and a double convex lens.

4. The illumination system of claim 1, wherein the collection lens emitting surface and collection lens diffusing surface comprise a double convex lens.

5. The illumination system of claim 1, wherein the collection lens emitting surface further comprises a substantially smooth surface.

6. The illumination system of claim 1, wherein the collection lens diffusing surface further comprises a planar diffusing surface.

7. The illumination system of claim 1, wherein at least one LED light source of the plurality of light sources comprises an array of LEDs.

8. The illumination system of claim 1, further comprising collimating optics configured to receive light from the diffusing collection lens.

9. The illumination system of claim 8, wherein the collimating optics comprise non-adjustable collimating optics.

10. The illumination system of claim 8, wherein the collimating optics further comprise at least one collimating light diffusing surface.

11. The illumination systems of claim 1, wherein the diffusing surface further comprises a light diffusing pattern.

12. The illumination system of claim 11, wherein the light diffusing pattern is formed by sandblasting the light collecting surface.

13. The illumination system of claim 11, wherein the light diffusing pattern is formed by lapping the light collecting surface.

14. A method for manufacturing a high power illumination system for a microscopy device comprising the steps of:
    forming a light collecting surface of a diffusing collection lens;
    forming a light emitting refractive surface of the diffusing collection lens;
    forming a diffusing surface upon the collecting surface of the diffusing lens;
    positioning the diffusing collection lens between a solid state illumination source and an optical coupling element configured to couple a light emission from the diffusing collection lens emitting surface along an optical axis to an optical output;
    orienting the diffusing collection lens collecting surface toward the solid state illumination source; and
    orienting the diffusing collection lens emitting surface toward the optical output.

15. The method of claim 14, further comprising the step of forming a housing configured to enclose the solid state illumination source, the diffusing collection lens, and the optical output.

16. The method of claim 14, wherein the light diffusing surface is formed by sandblasting the light collecting surface.

17. The method of claim 14, wherein the light diffusing surface is formed by lapping the light collecting surface.

* * * * *